United States Patent
Endo et al.

(10) Patent No.: US 9,202,505 B2
(45) Date of Patent: Dec. 1, 2015

(54) METHOD FOR MANUFACTURING GLASS SUBSTRATE FOR MAGNETIC RECORDING MEDIUM

(75) Inventors: Takeshi Endo, Osakasayama (JP); Takafumi Komatsu, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 168 days.

(21) Appl. No.: 13/976,808

(22) PCT Filed: Oct. 17, 2011

(86) PCT No.: PCT/JP2011/005781
§ 371 (c)(1),
(2), (4) Date: Jun. 27, 2013

(87) PCT Pub. No.: WO2012/090364
PCT Pub. Date: Jul. 5, 2012

(65) Prior Publication Data
US 2013/0288575 A1    Oct. 31, 2013

(30) Foreign Application Priority Data
Dec. 28, 2010   (JP) ................. 2010-293773

(51) Int. Cl.
*B24B 1/00*     (2006.01)
*G11B 5/84*     (2006.01)
*C03C 19/00*    (2006.01)

(52) U.S. Cl.
CPC .............. *G11B 5/8404* (2013.01); *C03C 19/00* (2013.01)

(58) Field of Classification Search
USPC ..................... 451/36, 41, 293, 527
See application file for complete search history.

(56) References Cited

U.S. PATENT DOCUMENTS

| 2003/0162482 A1* | 8/2003 | Okuhata et al. ................ 451/41 |
| 2007/0054601 A1 | 3/2007 | Bottema et al. |
| 2010/0009601 A1* | 1/2010 | Wang .............................. 451/36 |
| 2010/0086864 A1* | 4/2010 | Kojima et al. ................... 430/5 |
| 2013/0122785 A1* | 5/2013 | Matsui et al. .................. 451/36 |

FOREIGN PATENT DOCUMENTS

| JP | 10-249737 | 9/1998 |
| JP | 2007-294073 | 11/2007 |
| JP | 2008-282539 | 11/2008 |
| JP | 2009-507374 | 2/2009 |
| JP | 2009-64514 | 3/2009 |
| JP | 2010-115717 | 5/2010 |

* cited by examiner

*Primary Examiner* — Lee D Wilson
*Assistant Examiner* — Shantese McDonald
(74) *Attorney, Agent, or Firm* — Brinks Gilson & Lione (57) ABSTRACT

A method for manufacturing a glass substrate for a magnetic recording medium, including a polishing step of polishing a principal surface (12) of a glass substrate (10) having a chamfered surface (16) formed on an end surface of the glass substrate (10), with use of a polishing pad (24) having a concave groove (31) formed in a surface (24*a*) for supplying a polishing solution, the polishing step is performed in the following condition:

$$10°≤\theta p<\theta d≤80°$$

where $\theta d$ is an angle defined by the chamfered surface (16) and a plane in parallel to a thickness direction of the glass substrate (10) on an inner side portion of the glass substrate (10), and $\theta p$ is an angle defined by a concave groove side surface (31*a*) and a plane in parallel to a thickness direction of the polishing pad (24) on an inner side portion of the polishing pad (24).

14 Claims, 7 Drawing Sheets

METHOD FOR MANUFACTURING GLASS SUBSTRATE FOR MAGNETIC RECORDING MEDIUM

RELATED APPLICATIONS

This is a U.S. national stage of International application No. PCT/JP2011/005781 filed on Oct. 17, 2011.

This patent application claims the priority of Japanese application no. 2010-293773 filed Dec. 28, 2010, the disclosure content of which is hereby incorporated by reference.

TECHNICAL FIELD

The present invention relates to a method for manufacturing a glass substrate for use in a magnetic recording medium such as a hard disk.

BACKGROUND ART

For instance, a glass substrate for use in a magnetic recording medium such as a hard disk (HD) to be incorporated in a hard disk drive (HDD) is manufactured by performing a glass melting step of melting a glass material; a press molding step of forming a disc-shaped glass substrate by subjecting the molten glass material to press molding in a die; a coring step of forming a center hole in the center of the glass substrate; a first lapping step of preliminarily adjusting the thickness and the flatness of the glass substrate by grinding a principal surface (recording surface) of the annular glass substrate; an end-surface grinding step of finely adjusting the outer diameter and the degree of true circle of the glass substrate by grinding an inner peripheral end surface and an outer peripheral end surface of the glass substrate; an end-surface polishing step of polishing and smoothing the inner peripheral end surface and the outer peripheral end surface of the glass substrate; a second lapping step of finely adjusting the thickness and the flatness of the glass substrate by grinding the principal surface of the glass substrate; a first polishing step (rough polishing step) of roughly polishing and smoothing the principal surface of the glass substrate; a second polishing step of finely polishing and smoothing the principal surface of the glass substrate; and a washing step of washing the glass substrate.

In addition to the above, a chemical reinforcing step of reinforcing the surface of the glass substrate, and an inspecting step of inspecting the thickness and the flatness of the glass substrate may be performed. Further, for instance, a chamfering step of chamfering the inner peripheral end surface and the outer peripheral end surface of the glass substrate may be performed in the end surface grinding step in order to suppress chipping of a corner portion between the principal surface and the end surface of the glass substrate (a surface formed by the chamfering step is called a chamfered surface).

The polishing step to be performed in a final stage in manufacturing a glass substrate is generally performed with use of a dual side polishing machine, regardless of whether the polishing step is a rough polishing step or a fine polishing step. The dual side polishing machine is provided with an upper surface plate and a lower surface plate in the form of a cylindrical column, and is configured such that surfaces of the upper surface plate and the lower surface plate facing each other are in parallel to the rotating surfaces of carriers to be described next, and the rotating directions of the upper surface plate and the lower surface plate are opposite to each other. A polishing pad is attached to each of the opposing surfaces of the upper and lower surface plates for polishing the principal surfaces of glass substrates. A number of disc-shaped carriers are disposed on the polishing pad of the lower surface plate to revolve around the rotation center of the lower surface plate, while rotating themselves. A number of circular holes are formed in each of the carriers. A glass substrate is placed in each of the circular holes. The carriers and the glass substrates are held between the polishing pads of the upper and lower surface plates, and the upper and lower surface plates and the carriers rotate in this state (all the upper and lower surface plates and the carriers are moved relative to each other). During the rotation, a polishing solution is supplied between the polishing pads and the glass substrates, whereby the glass substrates are polished.

As described in patent literature 1, a polishing pad has concave grooves for supplying a polishing solution between polishing pads and glass substrates.

CITATION LIST

Patent Literature

Patent literature 1: JP 2010-115717A (paragraph [0013])

SUMMARY OF INVENTION

Generally, it is preferable to increase the surface area of a principal surface of a glass substrate in order to enhance the recording capacity of a magnetic recording medium. In view of the above, it is required to make the principal surface flat up to a boundary with respect to an inner peripheral end surface and/or an outer peripheral end surface of the glass substrate. Accordingly, in the case where a chamfered surface is formed by chamfering the inner peripheral end surface and/or the outer peripheral end surface, it is required to make the principal surface flat up to the boundary with respect to the chamfered surface. In order to meet the above requirement, it is necessary to form a corner portion (also referred to as a "principal surface corner portion", as necessary) between the principal surface and the chamfered surface into a sharp edge. This is because if the principal surface corner portion having a sharp edge is worn into a round shape, the flat portion of the principal surface decreases, which results in a reduction of the recording capacity. In view of the above, it is desired to suppress wear of the principal surface corner portion until a final stage in manufacturing a glass substrate.

Despite the above demand, however, the conventional art has a drawback that many of the glass substrates manufactured by the conventional art has a round principal surface corner portion, and the end surface shape is poor in the aspect of enhancing the recording capacity. This is because of the following reason.

Figure 7A:
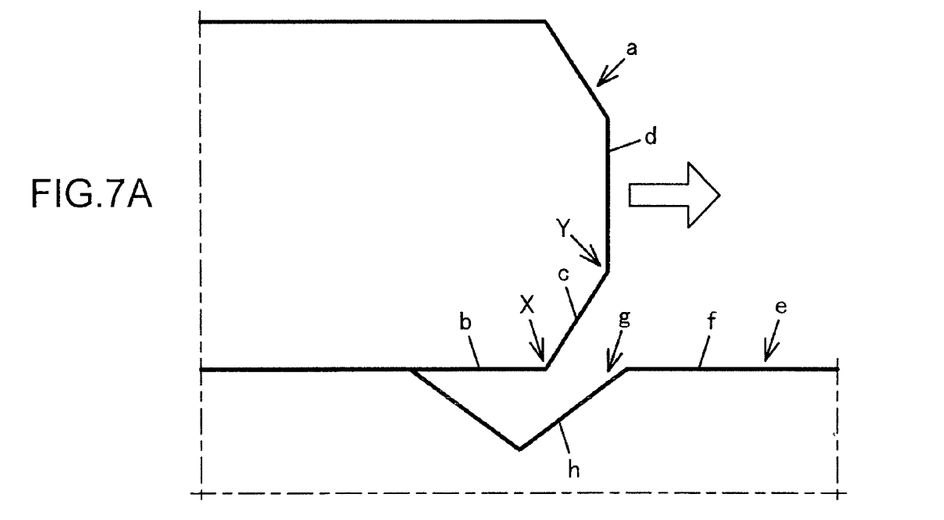
FIG. 7A shows a case, in which a glass substrate passes over a concave groove without sinking in a polishing pad.
Figure 7B:
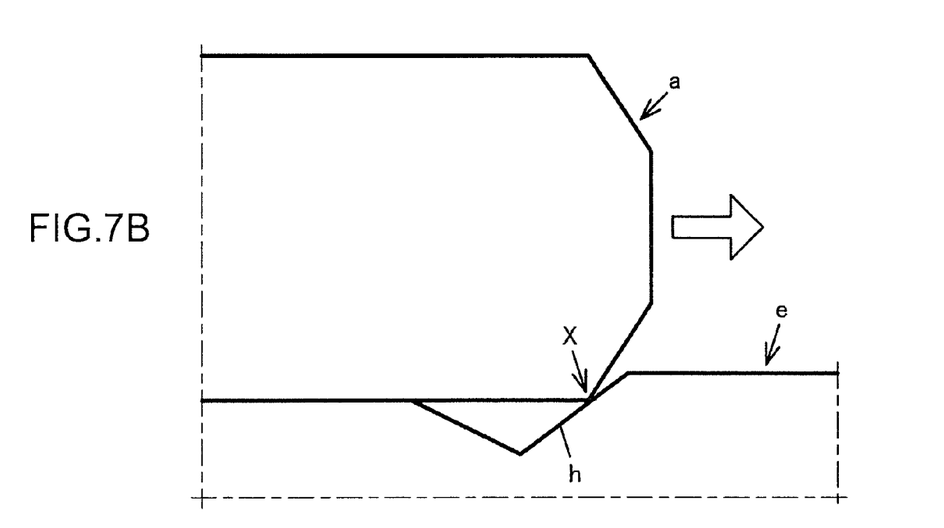
FIG. 7B shows a case, in which a glass substrate passes over a concave groove, while sinking in a polishing pad.

The reason is described referring to FIGS. 7A and 7B. Referring to FIGS. 7A and 7B, the reference sign "a" denotes a glass substrate, the reference sign "b" denotes a principal surface, the reference sign "c" denotes a chamfered surface, the reference sign "d" denotes a side wall surface (a portion formed between chamfered surfaces on each of the inner peripheral end surface and the outer peripheral surface), the reference sign "e" denotes a polishing pad, the reference sign "f" denotes a pad surface (surface of the polishing pad), the reference sign "g" denotes a concave groove, the reference sign "h" denotes a side surface of the concave groove, the reference sign "X" denotes a principal surface corner portion, and the reference sign "Y" denotes a corner portion (also referred to as a "side wall surface corner portion", as necessary) between the side wall surface and the chamfered surface. As shown in FIGS. 7A and 7B, the surface (pad surface)

"f" of the polishing pad "e" has the concave groove (in the example of FIGS. 7A and 7B, a V-shaped groove in section) "g" for supplying a polishing solution.

As described above, in the polishing step, the glass substrate "a" is held between the upper and lower polishing pads "e", and is moved relative to the polishing pads "e" in a plane direction. During the movement, the glass substrate "a" may pass over the concave groove "g" formed in the pad surface "f" (see the arrows in FIGS. 7A and 7B). As shown in FIG. 7A, in the case where the glass substrate "a" slides over the pad surface "f" without sinking in the polishing pad "e", there is no likelihood that the principal surface corner portion "X" contacts the side surface "h" of the concave groove "g" while the glass substrate "a" passes over the concave groove "g". However, usually, a pressure is applied from the polishing pad "e" onto the glass substrate "a". Accordingly, as shown in FIG. 7B, the glass substrate "a" sinks in the polishing pad "e". As a result, the principal surface corner portion "X" may contact the side surface "h" of the concave groove "g" in a first stage when the glass substrate "a" passes over the concave groove "g". A portion of the glass substrate "a" that has contacted the side surface "h" of the concave groove "g" in the first stage receives a large impact. As a result, the principal surface corner portion "X" having a sharp edge may be worn into a round shape, and the end surface shape of the finally obtained glass substrate "a" may be degraded.

Contact of the principal surface corner portion "X" with the side surface "h" of the concave groove "g" in the first stage may also occur, because a non-uniform distribution of load from the polishing pad "e" onto the glass substrate "a" due to lowering of the flatness of the opposing surfaces of the surface plates causes inclination of the glass substrate "a" with respect to the pad surface "f" from a parallel state. Further, contact of the principal surface corner portion "X" with the side surface "h" of the concave groove in the first stage when the glass substrate "a" passes over the concave groove "g" mainly occurs on the outer peripheral end surface of the glass substrate "a". However, the above drawback may also occur on the inner peripheral end surface of the glass substrate "a". The aforementioned drawback is a substantially serious problem in both of the outer peripheral end surface and the inner peripheral end surface in the aspect of increasing the surface area of the principal surface "b" of the glass substrate "a" for enhancing the recording capacity of a magnetic recording medium.

In view of the above, an object of the invention is to manufacture, in a method for manufacturing a glass substrate for a magnetic recording medium, a glass substrate that enables to suppress wear of a corner portion (principal surface corner portion) between a principal surface of the glass substrate having a chamfered surface formed on an inner peripheral end surface and/or an outer peripheral end surface of the glass substrate, and the chamfered surface.

Specifically, the invention is directed to a method for manufacturing a glass substrate for a magnetic recording medium including a polishing step of polishing a principal surface of a glass substrate having a chamfered surface formed on an inner peripheral end surface and/or an outer peripheral end surface of the glass substrate, with use of a polishing pad having a concave groove formed in a surface of the polishing pad for supplying a polishing solution. In the above method, the polishing step is performed in the following condition:

$$10° \leq \theta p < \theta d \leq 80°$$

where $\theta d$ is an angle (also referred to as a "chamfered surface angle", as necessary) defined by the chamfered surface and a plane in parallel to a thickness direction of the glass substrate on an inner side portion of the glass substrate, and $\theta p$ is an angle (also referred to as a "concave groove side surface angle", as necessary) defined by a side surface of the concave groove and a plane in parallel to a thickness direction of the polishing pad on an inner side portion of the polishing pad.

These and other objects, features and advantages of the present invention will become more apparent upon reading the following detailed description along with the accompanying drawings.

BRIEF DESCRIPTION OF DRAWINGS

FIGS. 6A to 6C are enlarged elevational sectional views describing operations of the embodiment of the invention, wherein FIGS. 7A and 7B are enlarged elevational sectional views describing a conventional drawback, wherein

DESCRIPTION OF EMBODIMENTS

Figure 1:
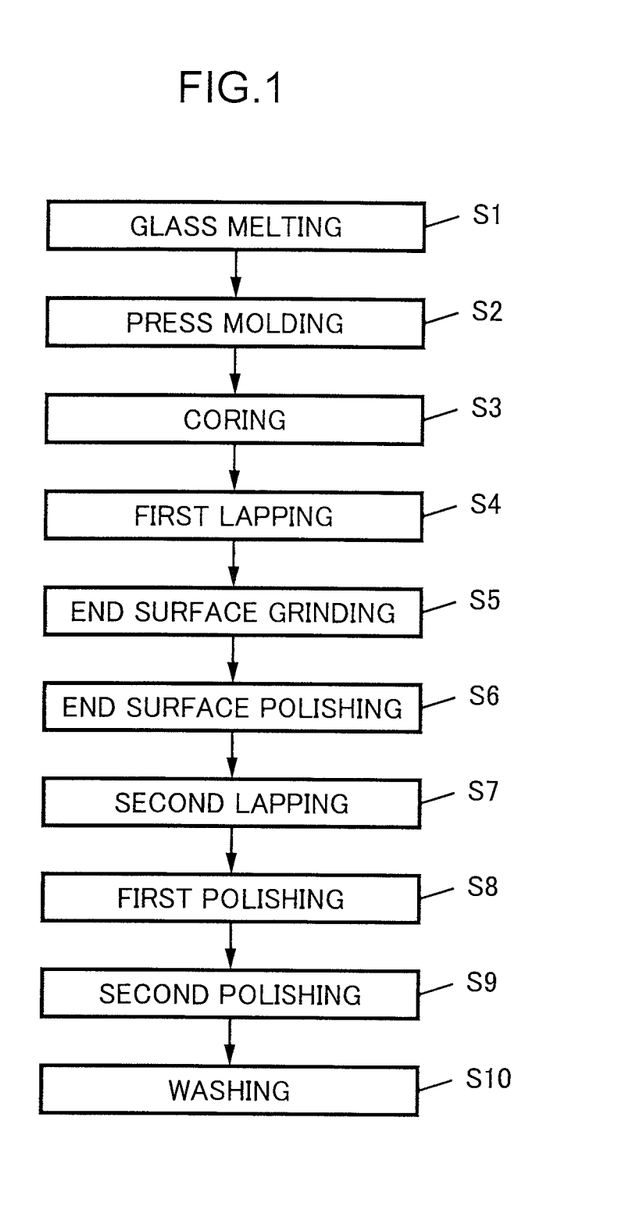
FIG. 1 is a diagram showing a process of manufacturing a glass substrate for a magnetic recording medium according to an embodiment of the invention.
Figure 2:
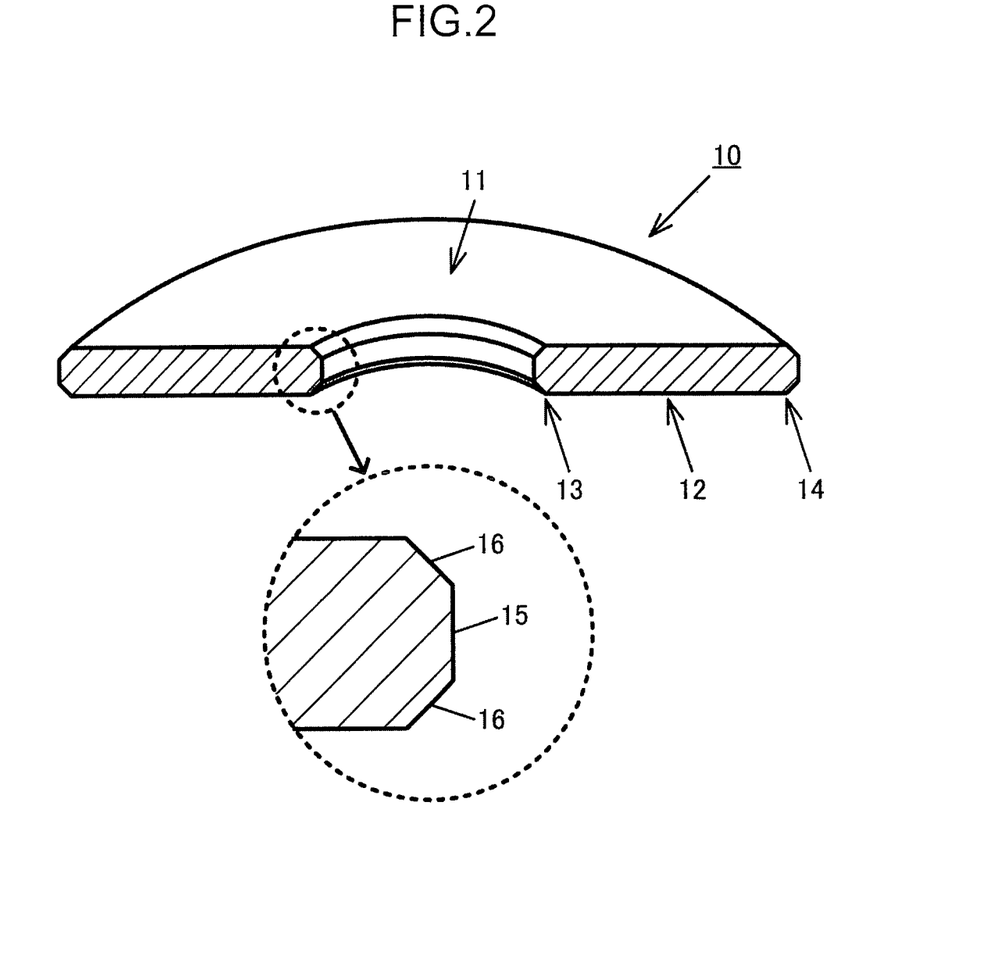
FIG. 2 is a sectional perspective view of a glass substrate for a magnetic recording medium in the embodiment of the invention.

In the following, an embodiment of the present invention is described referring to the drawings. FIG. 1 is a diagram showing a process of manufacturing a glass substrate for a magnetic recording medium in the embodiment, and FIG. 2 is a sectional perspective view of a glass substrate for a magnetic recording medium in the embodiment.

In this embodiment, a glass substrate 10 for a magnetic recording medium is manufactured by a glass melting step (Step S1), a press molding step (Step S2), a coring step (Step S3), a first lapping step (Step S4), an end surface grinding step (Step S5), an end surface polishing step (Step S6), a second lapping step (Step S7), a first polishing step (Step S8), a second polishing step (Step S9), and a washing step (Step S10).

In the glass melting step (S1), a glass material is melted. The glass material is composed of a glass composition containing silicon dioxide ($SiO_2$) as a main component. The glass composition may or may not contain magnesium, calcium, and/or cerium. A representative glass composition contains $SiO_2$, $Al_2O_3$, $B_2O_3$, $Li_2O$, $Na_2O$, $K_2O$, $MgO$, $CaO$, $BaO$, $SrO$, and $ZnO$.

In the press molding step (S2), a disc-shaped glass substrate is formed by pouring a molten glass material into a die and subjecting the molten glass material to press molding in the die. The glass substrates in this stage have sizes such that the outer diameters thereof are 2.5 inches, 1.8 inches, 1.0 inch, and 0.8 inch, and the thicknesses thereof are 2 mm, 1 mm, and 0.63 mm, for instance.

In the coring step (S3), a circular hole is formed in the center of the thus-obtained glass substrate, with use of a diamond core drill. In the first lapping step (S4), the thickness, the parallelism, and the flatness of the thus obtained annular glass substrate 10 are preliminarily adjusted by grinding principal surfaces (recording surface) 11 and 12 of the thus-obtained annular glass substrate 10. In the grinding process in the first lapping step, there is used a dual side grinding machine provided with grinding plates attached with diamond pellets thereon, for instance.

In the end surface grinding step (S5), the outer diameter and the degree of true circle of the glass substrate 10 are finely adjusted by grinding an inner peripheral end surface 13 and an outer peripheral end surface 14 of the glass substrate 10. In the end surface grinding step, a chamfered surface 16 is formed by chamfering the inner peripheral end surface 13 and the outer peripheral end surface 14 of the glass substrate 10, with use of a diamond grinding stone, for instance. In each of the inner peripheral end surface 13 and the outer peripheral end surface 14, a portion formed between the chamfered surfaces 16 and 16 is called a side wall surface 15.

In the end surface polishing step (S6), the inner peripheral end surface 13 and the outer peripheral end surface 14 of the glass substrate 10 are polished and smoothed. In the second lapping step (S7), the thickness, the parallelism, and the flatness of the glass substrate 10 are finely adjusted by grinding the principal surfaces 11 and 12 of the glass substrate 10. In the grinding process in the second lapping step, for instance, there is used a dual side grinding machine provided with grinding plates attached with diamond pellets thereon, for instance.

In the first polishing step (rough polishing step: S8), the principal surfaces 11 and 12 of the glass substrate 10 are smoothed by roughly polishing the principal surfaces 11 and 12. In the polishing of the first polishing step, for instance, there is used a dual side polishing machine provided with a pair of upper and lower surface plates, on each of which a hard polishing pad formed of foamed polyurethane and having a polishing layer containing closed pores is attached (namely, a polishing pad, in which the pores are closed, and the number of pores that are not opened toward the pad surface (surface of the polishing pad) is relatively large). A polishing solution containing cerium oxide as abrasive grains is used as the polishing solution. In the second polishing step (fine polishing step: S9), the principal surfaces 11 and 12 of the glass substrate 10 are further smoothed by finely polishing the principal surfaces 11 and 12. In the polishing of the second polishing step, for instance, there is used a dual side polishing machine provided with a pair of upper and lower surface plates, on each of which a suede-type soft polishing pad having a polishing layer formed of foamed polyurethane is attached (namely, a polishing pad, in which the pores are opened toward the pad surface, and the number of soft walls of the pores is relatively large). A polishing solution containing silica (colloidal silica) as abrasive grains is used as the polishing solution.

In the washing step (S10), foreign matter attached to the glass substrate 10 is washed and removed, with use of various washing solutions containing, for instance, filtered deionized water, ion-exchanged water, ultra deionized water, an acidic detergent solution, a neutral detergent solution, an alkaline detergent solution, an organic solvent, and a surfactant solution.

In addition to the above, a chemical reinforcing step of reinforcing the surface of the glass substrate 10, and an inspecting step of inspecting the thickness and the flatness of the glass substrate 10 may be performed. Then, in a final step, a magnetic layer is formed on each of the principal surfaces 11 and 12 of the glass substrate 10 manufactured by performing the above steps, whereby a magnetic recording medium such as a hard disk (HD) is obtained.

In the following, the polishing step, which is an important feature of the embodiment, is described in detail. The embodiment is described by taking an example of the second polishing step (S9). The same idea is applied to the first polishing step (S8). Further, the embodiment is described by taking an example of the outer peripheral end surface of the glass substrate 10. The same idea is applied to the inner peripheral end surface.

Figure 3:
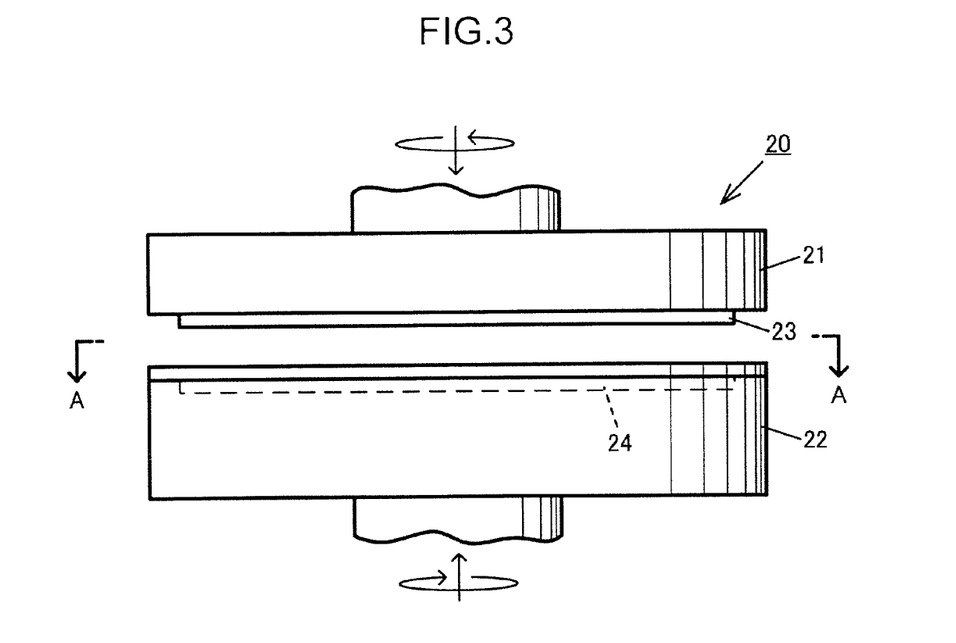
FIG. 3 is a partially side view showing a configuration of main components of a dual side polishing machine to be used in a polishing step in the embodiment of the invention.
Figure 4:
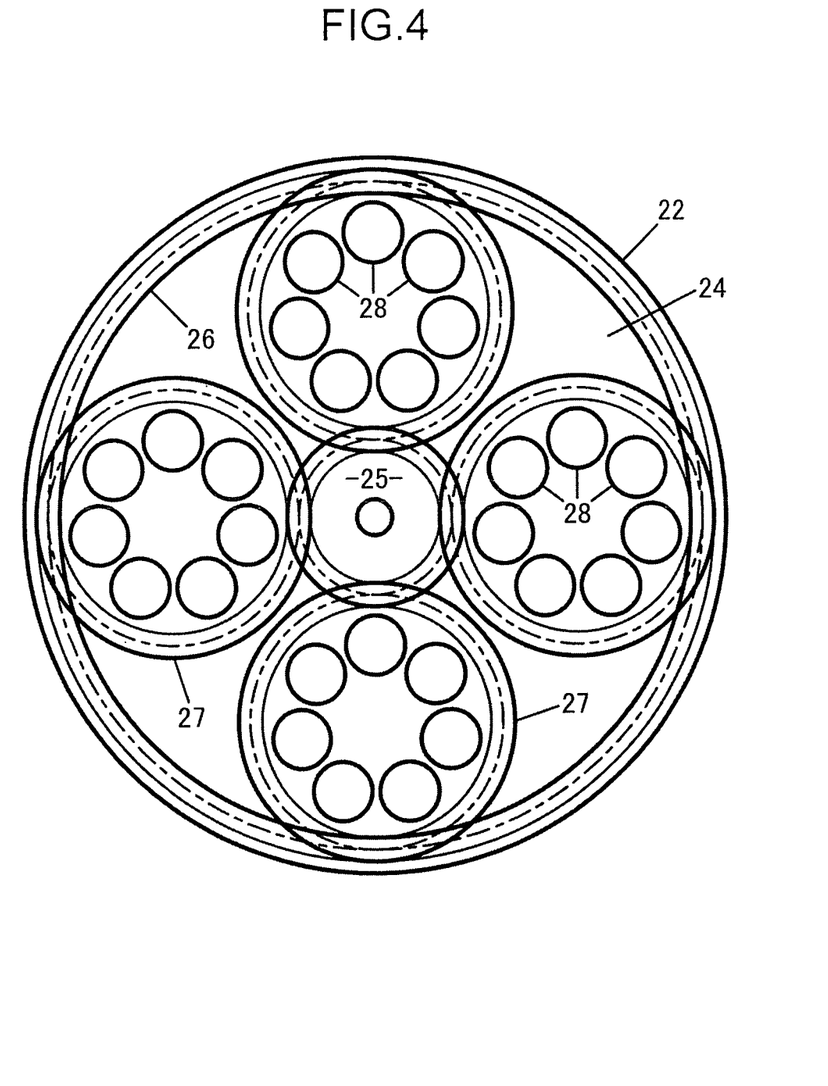
FIG. 4 is a fragmentary view taken along the arrow line A-A in FIG. 3.
Figure 5:
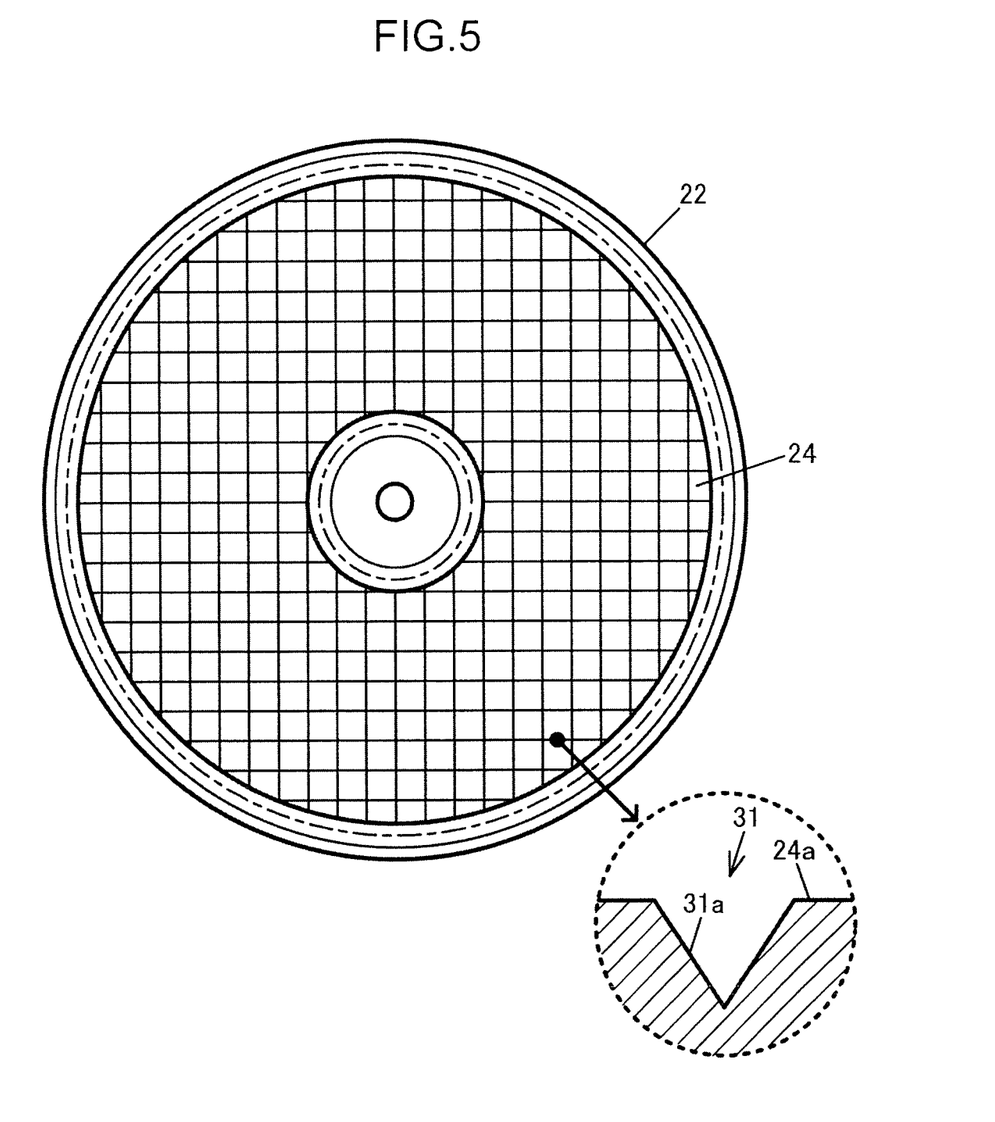
FIG. 5 is a plan view of a lower surface plate in a state that carriers are removed from the drawing of FIG. 4 and a polishing pad is exposed (an encircled portion in FIG. 5 is an enlarged elevational sectional view of a concave groove for supplying a polishing solution)

FIG. 3 is a partially side view showing a configuration of main components of a dual side polishing machine to be used in the second polishing step of the embodiment. FIG. 4 is a plan view of a lower surface plate taken along the arrow line A-A in FIG. 3. FIG. 5 is a plan view of the lower surface plate in a state that carriers are removed from the drawing of FIG. 4 and a polishing pad is exposed (an encircled portion in FIG. 5 is an enlarged elevational sectional view of a concave groove for supplying a polishing solution).

As shown in FIG. 3, a dual side polishing machine 20 is provided with a pair of an upper surface plate 21 and a lower surface plate 22. Each of the upper and lower surface plates 21 and 22 has a cylindrical column shape (outer diameter: about 1,000 mm). Surfaces of the upper and lower surface plates 21 and 22 facing each other are in parallel to the rotating surfaces of carriers 27 to be described next, and the rotating directions of the upper and lower surface plates 21 and 22 are opposite to each other. Polishing pads 23 and 24 are attached to the opposing surfaces of the upper and lower surface plates 21 and 22 for polishing the principal surfaces 11 and 12 of the glass substrate 10, respectively.

As shown in FIG. 4, a number of disc-shaped carriers 27 (in the example shown in FIG. 4, four carriers 27) are placed on the polishing pad 24 of the lower surface plate 22. A sun gear 25 is provided at a center part of the lower surface plate 22, and an internal gear 26 is provided on a peripheral edge portion of the lower surface plate 22. A gear tooth is formed on a peripheral edge portion of each of the carriers 27 for engagement with the sun gear 25 and with the internal gear 26. With the provision of the thus-configured planetary gear mechanism, when the sun gear 25 rotates, the carriers 27 revolve around the sun gear 25, while rotating themselves.

A number of circular holes 28 . . . 28 are formed in each of the carriers 27, and a glass substrate 10 is placed in each of the circular holes 28. By placing the upper surface plate 21 and the lower surface plate 22 to face each other in proximity to each other, the carriers 27 . . . 27 and the glass substrates 10 . . . 10 are held between the upper and lower polishing pads 23 and 24, and the upper and lower surface plates 21 and 22 and the carriers 27 are rotated (all the upper and lower surface plates 21 and 22 and the carriers 27 . . . 27 are moved relative to each other). In this state, a polishing solution is supplied between the polishing pads 23 and 24 and the glass substrates 10, whereby the glass substrates 10 are polished.

The polishing solution is poured between the polishing pads 23 and 24 of the upper and lower surface plats 21 and 22 facing each other in proximity to each other through an unillustrated polishing solution supply nozzle in a first stage of polishing.

In this embodiment, in the first polishing step (S8), a hard polishing pad formed of foamed polyurethane and having a polishing layer containing closed pores is used as the polishing pads 23 and 24; and in the second polishing step (S9), a suede-type soft polishing pad having a polishing layer formed of foamed polyurethane is used as the polishing pads 23 and 24. The invention is not limited to the above. For instance, a suede-type soft polishing pad having a polishing layer formed of foamed polyurethane may be used in the first polishing step in order to suppress degradation of the end surface shape of the glass substrates 10. Further, these polishing pads may be such that the polishing layer is made of a material other than foamed polyurethane, for instance, foam made of other resin such as polyester.

In this embodiment, the hardness of the soft polishing pad has an Asker C hardness in the range of from 60 to 85 in order to satisfy both of the requirements on the processing rate (polishing rate) and the surface quality of the glass substrate 10 (quality of the principal surfaces 11 and 12).

In this embodiment, a polishing solution is slurry containing abrasive grains (loose grains). The type of abrasive grains is not specifically limited, and the one conventionally and generally used in the field of glass polishing may be used. Preferred examples of the abrasive grains are cerium oxide, silicon carbide, silica (colloidal silica), zirconia, and alumina. Among these, it is more preferable to use cerium oxide in the first polishing step (S8), and it is more preferable to use silica (colloidal silica) in the second polishing step (S9), in view of the cost and flatness to be obtained. The average particle diameter of the latter abrasive grains is preferably in the range of from 1 to 100 nm, more preferably in the range of from 1 to 80 nm, furthermore preferably in the range of from 1 to 50 nm, and particularly preferably in the range of from 1 to 20 nm, in view of flatness to be obtained.

In this embodiment, a polishing solution containing cerium oxide as abrasive grains is used in the first polishing step (S8), and a polishing solution containing silica (colloidal silica) as abrasive grains is used in the second polishing step (S9), as the polishing solution. The invention, however, is not limited to the above.

As shown in FIG. 5, concave grooves 31 are formed in the polishing pad 24 for supplying a polishing solution between the polishing pad 24 and the glass substrates 10 (in the example shown in FIG. 5, the polishing pad is the polishing pad 24 of the lower surface plate 22, but the same idea is applied to the polishing pad 23 of the upper surface plate 21). Specifically, the concave grooves 31 for supplying a polishing solution are formed at a certain pitch in a surface (pad surface) 24a of the polishing pad 24. In the example shown in FIG. 5, the concave grooves 31 are formed in the form of a grid pattern. This is merely an example, and the concave grooves 31 may be formed in the form of another pattern (for instance, a radial pattern, a helical pattern, or combination of these patterns etc.).

In this embodiment, the pitch of the concave grooves 31 is in the range of from about 10 to 50 mm, and the groove width (groove width on the pad surface 24a) is in the range of from about 1 to 5 mm, for instance. These specifications may be varied, as necessary, according to the size of the upper and lower surface plates 21 and 22 (in this embodiment, the outer diameter is about 1,000 mm), or the size of the glass substrates 10 (in this embodiment, the sizes are 2.5 inches, 1.8 inches, 1.0 inch, and 0.8 inch).

As shown by the enlarged encircled portion in FIG. 5, the concave groove 31 has a V-shape in section, and a side surface 31a is not in parallel to the thickness direction of the polishing pad 24, but is inclined with respect to the thickness direction.

Figure 6A:
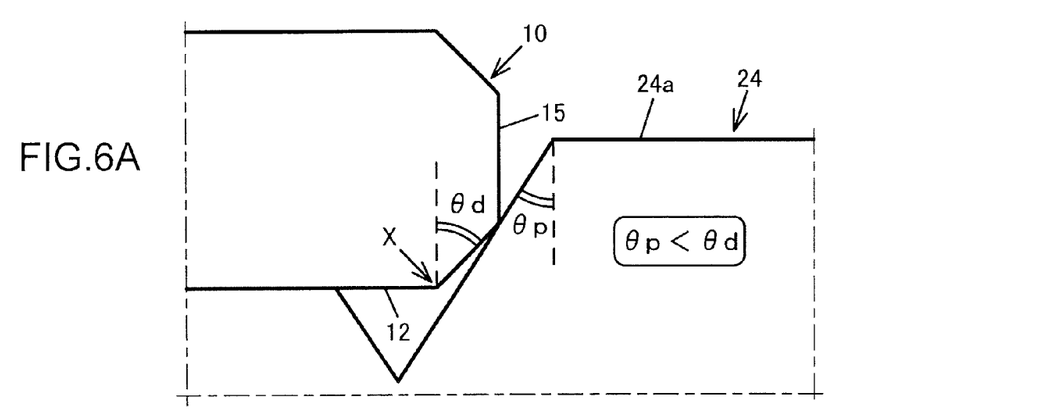
FIG. 6A shows an operation in the case where the chamfered surface angle $\theta d$ is larger than the concave groove side surface angle $\theta p$.

In this embodiment, as shown in FIG. 6A, the second polishing step is performed in a condition: $\theta p < \theta d$, in other words, in a condition that a chamfered surface angle $\theta d$ is larger than a concave groove side angle $\theta p$, where $\theta d$ is an angle (chamfered surface angle) defined by the chamfered surface 16 and a plane in parallel to the thickness direction of the glass substrate 10 on an inner side portion of the glass substrate 10, and $\theta p$ is an angle (concave groove side surface angle) defined by the side surface 31a of the concave groove 31 and a plane in parallel to the thickness direction of the polishing pad 24 on an inner side portion of the polishing pad 24.

By setting the above condition, as shown in FIG. 6A, in the second polishing step, in the case where the glass substrate 10 passes over the concave groove 31 in a state that the glass substrate 10 sinks in the polishing pad 24, a corner portion (side wall corner portion) Y between the side wall surface 15 and the chamfered surface 16 contacts the concave groove side surface 31a in a first stage. Further, in the case where a sinking amount of the glass substrate 10 is small, the chamfered surface 16 contacts the concave groove side surface 31a in a first stage. However, even in the case where the glass substrate 10 passes over the concave groove 31 in a state that the glass substrate 10 sinks in the polishing pad 24, it is possible to avoid contact of a corner portion (principal surface corner portion) X between the principal surface 12 and the chamfered surface 16 with the concave groove side surface 31a in a first stage. Accordingly, it is possible to avoid a drawback that the principal surface corner portion X having a sharp edge is worn into a round shape, and the end surface shape of the finally obtained glass substrate 10 is degraded. Thus, it is possible to stably obtain a magnetic recording medium having a large recording capacity.

Figure 6B:
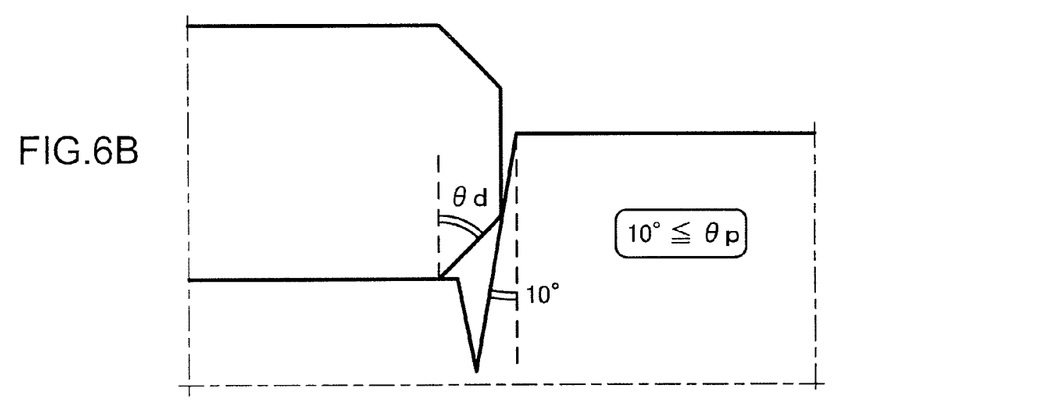
FIG. 6B shows an operation in the case where the concave groove side surface angle $\theta p$ is 10° or larger.

In addition to the above, in this embodiment, as shown in FIG. 6B, the second polishing step is performed in a condition: $10° \leq \theta p$, in other words, in a condition that the concave groove side surface angle $\theta p$ is 10° or larger.

By setting the above condition, the polishing solution within the concave grooves 31 is smoothly supplied onto the pad surface (surface of the polishing pad 24) 24a. In other words, if the concave groove side surface angle $\theta p$ is smaller than 10°, the concave groove side surface 31a is close to an upright state, and does not face the pad surface 24a. Accordingly, the amount of polishing solution to be supplied onto the pad surface 24a within the concave grooves 31 is relatively small. As a result, it is difficult to supply the polishing solution between the polishing pad 24 and the glass substrates 10. Accordingly, it is difficult to polish the glass substrates 10 in a satisfactory manner. On the other hand, in the case where the concave groove side surface angle $\theta p$ is 10° or larger, the amount of polishing solution to be supplied onto the pad surface 24a within the concave grooves 31 is relatively large. Accordingly, it is possible to smoothly supply the polishing solution between the polishing pad 24 and the glass substrates 10. Thus, it is possible to polish the glass substrates 10 in a satisfactory manner. Further, combining the above condition with the condition: $\theta p < \theta d$ makes the chamfered surface angle $\theta d$ larger than 10°. Accordingly, it is possible to suppress a drawback that a stress is locally concentrated due to an excessively acute angle of the principal surface corner portion X, thereby causing chippage or breakage.

The concave groove side surface angle θp is preferably 15° or larger, more preferably 20° or larger, and furthermore preferably 25° or larger.

Figure 6C:
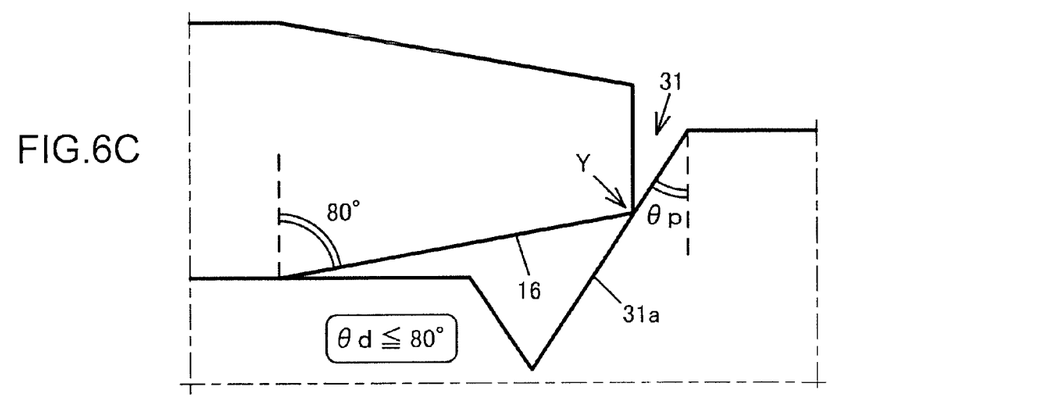
FIG. 6C shows an operation in the case where the chamfered surface angle $\theta d$ is 80° or smaller.

In addition to the above, in this embodiment, as shown in FIG. 6C, the second polishing step is performed in a condition: θd≤80°, in other words, in a condition that the chamfered surface angle θd is 80° or smaller.

By setting the above condition, it is possible to suppress a drawback that a stress is locally concentrated due to an excessively acute angle of the side wall surface corner portion Y, which may cause chippage or breakage, and to suppress a drawback that the amount of reduction in the surface area of the principal surface 12 by a chamfering process increases. Further, combining the above condition with the condition: θp<θd makes the concave groove side surface angle θp smaller than 80°. Accordingly, the depth of the concave grooves 31 is made sufficient, and a sufficient amount of the polishing solution is held in the concave grooves 31. Thus, it is possible to polish the glass substrates 10 in a satisfactory manner.

The chamfered surface angle θd is preferably 75° or smaller, more preferably 70° or smaller, and furthermore preferably 65° or smaller.

In this embodiment, the polishing pads 23 and 24 are a suede-type soft polishing pad having a polishing layer formed of foamed polyurethane (in this embodiment, a soft polishing pad is used in the second polishing step, but a soft polishing pad may be used in the first polishing step). In this configuration, in the polishing step (S8, S9) of determining the final shape of the glass substrates 10, as compared with a configuration, in which a hard polishing pad made of foamed polyurethane and having a polishing layer containing closed pores is used, it is possible to finely and precisely polish the principal surfaces 11 and 12 of the glass substrates 10. Thus, it is possible to enhance the smoothness of the principal surfaces 11 and 12, and to enhance the productivity of the glass substrates 10. Further, enhancing the shape precision of the principal surfaces 11 and 12 enables to make the principal surfaces 11 and 12 flat up to the boundaries with respect to the end surfaces 13 and 14. Thus, it is possible to increase the surface area of the principal surfaces 11 and 12. Accordingly, it is possible to stably obtain a magnetic recording medium having a large recording capacity.

In this embodiment, in the polishing step, there is used a polishing solution containing silica (colloidal silica) as abrasive grains (in this embodiment, the polishing solution is used in the second polishing step, but the polishing solution may be used in the first polishing step). In the above configuration, in the polishing step (S8, S9) of determining the final shape of the glass substrates 10, as compared with a configuration, in which a polishing solution containing cerium oxide as abrasive grains is used, it is possible to finely and precisely polish the principal surfaces 11 and 12 of the glass substrates 10. Thus, it is possible to enhance the smoothness of the principal surfaces 11 and 12, and to enhance the productivity of the glass substrates 10. Further, enhancing the shape precision of the principal surfaces 11 and 12 enables to make the principal surfaces 11 and 12 flat up to the boundaries with respect to the end surfaces 13 and 14. Thus, it is possible to increase the surface area of the principal surfaces 11 and 12. Accordingly, it is possible to stably obtain a magnetic recording medium having a large recording capacity. Further, since silica has a high processing rate (polishing rate), the above configuration is also advantageous in performing a polishing process in a short time.

In this embodiment, there is used a suede-type soft polishing pad having a polishing layer formed of foamed polyurethane, with an Asker C hardness in the range of from 60 to 85. Accordingly, it is possible to meet both of the requirements on the processing rate, and the surface quality of the glass substrates 10 (quality of the principal surfaces 11 and 12). For instance, in the case where the Asker C hardness is smaller than 60, the processing rate is lowered, and the polishing pad may be deformed. This may lower the flatness of the surfaces of the glass substrates 10. Further, in the case where the Asker C hardness is larger than 85, scratches may be formed on the surfaces of the glass substrates 10. This may lower the quality of the surfaces of the glass substrates 10.

In this embodiment, the sectional shape of the concave grooves 31 is a V-shape. The invention is not limited to the above. For instance, as long as the aforementioned conditions (θp<θd, 10°≤θp, θd≤80°) are satisfied, the side surface 31a may be a curved slope, in place of a straight slope, and may be a slope with different gradients, in place of a slope with a gradient. Further, the lower portion of the concave grooves 31 (a portion where the glass substrate 10 hardly contacts) may not have a slope.

The following is a summary of the technical features of the embodiment.

A method for manufacturing a glass substrate for a magnetic recording medium of the embodiment is a method for manufacturing a glass substrate for a magnetic recording medium including a polishing step of polishing a principal surface of a glass substrate having a chamfered surface formed on an inner peripheral end surface and/or an outer peripheral end surface of the glass substrate, with use of a polishing pad having a concave groove formed in a surface of the polishing pad for supplying a polishing solution. In the above method, the polishing step is performed in the following condition:

$$10°≤θp<θd≤80°$$

where

θd is an angle (also referred to as a "chamfered surface angle", as necessary) defined by the chamfered surface and a plane in parallel to a thickness direction of the glass substrate on an inner side portion of the glass substrate, and θp is an angle (also referred to as a "concave groove side surface angle", as necessary) defined by a side surface of the concave groove and a plane in parallel to a thickness direction of the polishing pad on an inner side portion of the polishing pad.

In the above configuration, the chamfered surface angle θd is larger than the concave groove side surface angle θp. Accordingly, in the polishing step, in the case where the glass substrate passes over the concave groove in a state that the glass substrate sinks in the polishing pad, the chamfered surface (indicated by the reference sign "c" in FIGS. 7A and 7B) or the side wall surface corner portion (indicated by the reference sign "Y" in FIGS. 7A and 7B) contacts the side surface of the concave groove (indicated by the reference sign "h" in FIGS. 7A and 7B) in a first stage. In the above configuration, even in the case where the glass substrate passes over the concave groove in a state that the polishing pad sinks in the polishing pad, it is possible to avoid a drawback that the principal surface corner portion (indicated by the reference sign "X" in FIGS. 7A and 7B) contacts the side surface of the concave groove in a first stage. Thus, it is possible to avoid a drawback that the principal surface corner portion having a sharp edge is worn into a round shape, and the end surface shape of the finally obtained glass substrate is degraded. Accordingly, it is possible to stably obtain a magnetic recording medium having a large recording capacity.

In addition to the above, the concave groove side surface angle θp is set to be 10° or larger. Accordingly, it is possible to supply the polishing solution within the concave groove onto the pad surface (surface of the polishing pad) in a satisfactory manner. Thus, it is possible to supply the polishing solution between the polishing pad and the glass substrate in a satisfactory manner, and to polish the glass substrate in a satisfactory manner. Further, combining the above condition with the condition: θp<θd makes the chamfered surface angle θd larger than 10°. Thus, it is possible to suppress a drawback that a stress is locally concentrated in polishing due to an excessively acute angle of the principal surface corner portion, thereby causing chippage or breakage.

In addition to the above, the chamfered surface angle θd is set to be 80° or smaller. Accordingly, it is possible to suppress a drawback that a stress is locally concentrated in polishing due to an excessively acute angle of the side wall surface corner portion, which may cause chippage or breakage, and to suppress a drawback that the amount of reduction in the surface area of the principal surface by a chamfering process increases. Further, combining the above condition with the condition: θp<θd makes the concave groove side surface angle θp smaller than 80°. Accordingly, the depth of the concave groove is made sufficient, and a sufficient amount of the polishing solution is held in the concave groove. Thus, it is possible to polish the glass substrate in a satisfactory manner.

In the above manufacturing method, preferably, the polishing pad may be a suede-type soft polishing pad having a polishing layer formed of foamed polyurethane. This is because, in the polishing step of determining the final shape of the glass substrate, as compared with a configuration, in which a hard polishing pad made of foamed polyurethane and having a polishing layer containing closed pores is used, it is possible to finely and precisely polish the principal surface of the glass substrate, and accordingly, it is possible to enhance the smoothness of the principal surface, and to enhance the productivity of the glass substrate. Further, the above advantage is obtained, because enhancing the shape precision of the principal surface enables to make the principal surface flat up to the boundary with respect to the end surface, and accordingly, it is possible to increase the surface area of the principal surface. Thus, it is possible to stably obtain a magnetic recording medium having a large recording capacity.

In the above manufacturing method, preferably, a polishing solution containing silica as abrasive grains may be used in the polishing step. This is because, in the polishing step of determining the final shape of the glass substrate, as compared with a configuration, in which a polishing solution containing cerium oxide as abrasive grains is used, it is possible to finely and precisely polish the principal surface of the glass substrate, and accordingly, it is possible to enhance the smoothness of the principal surface, and to enhance the productivity of the glass substrate. Further, the above advantage is obtained, because enhancing the shape precision of the principal surface enables to make the principal surface flat up to the boundary with respect to the end surface, and accordingly, it is possible to increase the surface area of the principal surface. Thus, it is possible to stably obtain a magnetic recording medium having a large recording capacity. Further, since silica has a high processing rate (polishing rate), the above configuration is also advantageous in performing a polishing process in a short time.

In the above manufacturing method, preferably, the polishing pad may have an Asker C hardness in a range of from 60 to 85. This is because both of the requirements on the processing rate and the surface quality of the glass substrate (quality of the principal surface) are satisfied.

According to the embodiment, in a method for manufacturing a glass substrate for a magnetic recording medium, it is possible to manufacture a glass substrate that enables to suppress wear of a corner portion (principal surface corner portion) between a principal surface of the glass substrate having a chamfered surface formed on an inner peripheral end surface and/or an outer peripheral end surface, and the chamfered surface. Accordingly, it is possible to stably obtain a magnetic recording medium having a large recording capacity.

EXAMPLES

In the following, the invention is described in detail by way of examples. It should be noted, however, that the invention is not limited by the examples.

(Preparing Glass Substrate)

Annular aluminosilicate glass substrates each having an outer diameter of about 65 mm (2.5 inches) and an inner diameter (diameter of a circular hole) of about 20 mm were prepared by performing the glass melting step (S1), the press molding step (S2), the coring step (S3), the first lapping step (S4), the end surface grinding step (S5), the end surface polishing step (S6), the second lapping step (S7), and the first polishing step (S8), with use of a glass material having the following composition (mass %) according to the manufacturing process shown in FIG. 1. Chamfered surfaces were formed so that the chamfered surface angle θd was set to 45°, and the chamfering length was set to 0.15 mm.

(Composition of Glass Material)

$SiO_2$: 50 to 70%

$Al_2O_3$: 0 to 20%

$B_2O_3$: 0 to 5%

The total content of $SiO_2+Al_2O_3+B_2O_3$=50 to 85%, $Li_2O+Na_2O+K_2O$=0 to 20%, and $MgO+CaO+BaO+SrO+ZnO$=0 to 20%.

(Performing Second Polishing Step)

Fine polishing of the thus-formed glass substrates was performed, with use of the dual side polishing machine as shown in FIGS. 3 to 5. A suede-type soft polishing pad (Asker C hardness: 78) having a polishing layer formed of foamed polyurethane was used as the polishing pad. A polishing solution containing colloidal silica (average particle diameter: 20 nm) as abrasive grains was used as the polishing solution. Concave grooves in the form of a grid pattern were formed as the concave groove for supplying a polishing solution. The groove pitch was set to 40 mm, and the groove width was set to 3 mm. One hundred glass substrates as one batch were set on the carriers, and the principal surfaces were finely polished in a condition, in which the polishing amount was set to 0.5 µm, and the polishing time was set to 20 minutes.

Example 1

In Example 1, the concave groove side surface angle θp of the concave groove for supplying a polishing solution was set to 40°. In other words, the second polishing step was performed while satisfying the condition: 10°≤θp<θd≤80° (where θd=45°). After the washing step was performed with use of filtered deionized water, evaluation of the corner portion (principal surface corner portion) between the principal surface and the chamfered surface of the obtained glass substrates, and evaluation of the flatness of the obtained glass substrates were performed.

The evaluation of the principal surface corner portion was performed by obtaining a curvature of the principal surface corner portion with use of "Contracer CP-400" (contour measuring instrument) by Mitsutoyo Corporation, grading the products whose curvature was 0.05 mm or larger as quality products, and obtaining the rate (yield) of quality products.

The evaluation of the flatness of the glass substrates was performed by obtaining TIR with use of "OptiFlat" (optical interferotype surface shape measuring apparatus) by Phase Shift Technology, Inc., grading the products whose TIR was 2 μm or larger as quality products, and obtaining the rate (yield) of quality products. In the specification, TIR denotes an index representing the flatness of a glass substrate, and is a value equal to the sum of a distance from a least square flat plane to a highest point on an evaluation plane, and a distance from the least square flat plane to a lowest point on the evaluation plane. The highest point and the lowest point are obtained from measurement values corresponding to one turn in a circumferential direction at a radial position of 25 mm on the evaluation plane.

As a result of the evaluations, the yield of quality products regarding the principal surface corner portion was 90%, and the yield of quality products regarding the flatness was 89%. Accordingly, Example 1 clearly shows that wear of the principal surface corner portion is sufficiently suppressed, and a sufficient surface area of the principal surface (recording surface) of the glass substrate is secured.

Example 2

In Example 2, the second polishing step and the washing step were performed substantially in the same manner as in Example 1 except that the concave groove side surface angle θp of the concave groove for supplying a polishing solution was set to 30°, and evaluation of the principal surface angle and evaluation of the flatness were performed. As a result of the evaluations, the yield of quality products regarding the principal surface corner portion was 92%, and the yield of quality products regarding the flatness was 87%. Accordingly, Example 2 also clearly shows that wear of the principal surface corner portion is sufficiently suppressed, and a sufficient surface area of the principal surface (recording surface) of the glass substrate is secured.

Comparative Example 1

In Comparative Example 1, the second polishing step and the washing step were performed substantially in the same manner as in Example 1 except that the concave groove side surface angle θp of the concave groove for supplying a polishing solution was set to 50°, in other words, except that the condition: $10°≤θp$ and the condition: $θd≤80°$ were satisfied, but the condition: $θp<θd$ was not satisfied; and evaluation of the principal surface angle and evaluation of the flatness were performed. As a result of the evaluations, the yield of quality products regarding the principal surface corner portion was 78%, and the yield of quality products regarding the flatness was 88%. Accordingly, Comparative Example 1 shows that wear of the principal surface corner portion is not sufficiently suppressed. This is conceivably because the condition: $θp<θd$ is not satisfied, and accordingly, the principal surface corner portion contacts the side wall of the concave groove in a first stage in the second polishing step.

Comparative Example 2

In Comparative Example 2, the second polishing step and the washing step were performed substantially in the same manner as in Example 1 except that the concave groove side surface angle θp of the concave groove for supplying a polishing solution was set to 8°, in other words, except that the condition: $θp<θd$ and the condition: $θd≤80°$ were satisfied, but the condition: $10°≤θp$ was not satisfied; and evaluation of the principal surface angle and evaluation of the flatness were performed. As a result of the evaluations, the yield of quality products regarding the principal surface corner portion was 87%, and the yield of quality products regarding the flatness was 72%. Accordingly, Comparative Example 2 shows that the flatness of the glass substrates is lowered. This is conceivably because the condition: $10°≤θp$ is not satisfied, and accordingly, the polishing solution in the concave groove is not supplied onto the pad surface in a satisfactory manner.

The present application is based on Japanese Patent Application No. 2010-293773 filed on Dec. 28, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

The present invention has a wide industrial applicability in the technical field of a method for manufacturing a glass substrate for a magnetic recording medium.

The invention claimed is:

1. A method for manufacturing a glass substrate for a magnetic recording medium, the method comprising:
providing a glass substrate having a chamfered surface formed on an inner peripheral end surface and/or an outer peripheral end surface of the glass substrate; and
polishing a principal surface of the glass substrate with use of a polishing pad having a concave groove formed in a surface of the polishing pad for supplying a polishing solution, wherein the polishing is performed in the following condition:

$$10°≤θp<θd≤80°$$

where
θd is an angle defined by the chamfered surface and a plane in parallel to a thickness direction of the glass substrate on an inner side portion of the glass substrate, and
θp is an angle defined by a side surface of the concave groove and a plane in parallel to a thickness direction of the polishing pad on an inner side portion of the polishing pad.

2. The method for manufacturing a glass substrate for a magnetic recording medium according to claim 1, wherein the polishing pad is a suede-type soft polishing pad having a polishing layer formed of foamed polyurethane.

3. The method for manufacturing a glass substrate for a magnetic recording medium according to claim 1, wherein a polishing solution containing silica as abrasive grains is used in the polishing step.

4. The method for manufacturing a glass substrate for a magnetic recording medium according to claim 1, wherein the polishing pad has an Asker C hardness in a range of from 60 to 85.

5. The method for manufacturing a glass substrate for a magnetic recording medium according to claim 1, wherein the polishing is performed in accordance with the following condition:

$$25°≤θp<θd≤65°.$$

6. The method for manufacturing a glass substrate for a magnetic recording medium according to claim 1, wherein a curvature of a corner portion of the glass substrate between the principal surface and the chamfered surface is greater than or equal to 0.05 mm.

7. The method for manufacturing a glass substrate for a magnetic recording medium according to claim 1, wherein θp and θd are chosen such that should the glass substrate fall in the groove a corner portion of the glass substrate between the principal surface and the chamfered surface is prevented from contacting the groove.

8. The method for manufacturing a glass substrate for a magnetic recording medium according to claim 1, wherein θp and θd are chosen such that should the glass substrate fall in the groove a corner portion of the glass substrate between the principal surface and the chamfered surface is prevented from being worn into a round shape.

9. The method for manufacturing a glass substrate for a magnetic recording medium according to claim 1, wherein θp and θd are chosen such that when the polishing solution is supplied to the polishing pad via the groove, the polishing solution is smoothly supplied onto the polishing pad.

10. The method for manufacturing a glass substrate for a magnetic recording medium according to claim 1, wherein the concave groove comprises a planar side that extends along a length of the groove.

11. The method for manufacturing a glass substrate for a magnetic recording medium according to claim 10, wherein the concave groove comprises a second planar side that faces the planar side and extends along the length of the groove.

12. The method for manufacturing a glass substrate for a magnetic recording medium according to claim 11, wherein a height of the planar side is different in value than a height of the second planar side.

13. The method for manufacturing a glass substrate for a magnetic recording medium according to claim 11, wherein the planar side and the second planar side contact each other.

14. The method for manufacturing a glass substrate for a magnetic recording medium according to claim 13, wherein a height of the planar side is different in value than a height of the second planar side.

* * * * *